US00RE47063E

(19) United States
(12) Reissued Patent
Apfel et al.

(10) Patent Number: US RE47,063 E
(45) Date of Reissued Patent: Sep. 25, 2018

(54) HEARING AID, COMPUTING DEVICE, AND METHOD FOR SELECTING A HEARING AID PROFILE

(71) Applicant: III Holdings 4, LLC, Wilmington, DE (US)

(72) Inventors: Russell J. Apfel, Austin, TX (US); David Matthew Landry, Austin, TX (US)

(73) Assignee: III HOLDINGS 4, LLC, Wilmington, DE (US)

(21) Appl. No.: 14/857,792

(22) Filed: Sep. 17, 2015

Related U.S. Patent Documents

Reissue of:
(64) Patent No.: 8,538,049
Issued: Sep. 17, 2013
Appl. No.: 13/024,309
Filed: Feb. 9, 2011

U.S. Applications:
(60) Provisional application No. 61/304,390, filed on Feb. 12, 2010.

(51) Int. Cl.
*H04R 25/00* (2006.01)

(52) U.S. Cl.
CPC ..... *H04R 25/70* (2013.01); *H04R 2225/55* (2013.01)

(58) Field of Classification Search
CPC ..... H04R 24/70; H04R 2225/55
USPC ..... 381/312, 314, 320
See application file for complete search history.

(56) References Cited

U.S. PATENT DOCUMENTS 4,622,440 A 11/1986 Slavin
4,845,755 A 7/1989 Busch
4,947,432 A 8/1990 Topholm
4,972,487 A 11/1990 Mangold et al.
5,303,306 A 4/1994 Brillhart
5,524,150 A 6/1996 Sauer
(Continued)

FOREIGN PATENT DOCUMENTS

WO 2008071236 A2 6/2008
WO 2009001559 A1 12/2008

OTHER PUBLICATIONS

"Good Practice Guidance for Adult Hearing Aid Fittings and Services," prepared for International Society of Audiology, Nov. 2004, 8 pages. Exhibit 1012, Case IPR2017-00781.

(Continued)

*Primary Examiner* — Ovidio Escalante
(74) *Attorney, Agent, or Firm* — Perkins Coie LLP

(57) ABSTRACT

A hearing aid includes a microphone to convert sounds into electrical signals, a transceiver configured to communicate with a computing device through a wireless communication channel, and a processor coupled to the microphone and the transceiver. The hearing aid further includes a memory accessible to the processor and configured to store a table including plurality of hearing aid profile identifiers (IDs). Each of the plurality of hearing aid profile IDs corresponds to a respective one of a plurality of hearing aid profiles. The memory stores instructions that, when executed by the processor cause the processor to identify a hearing aid profile ID from the table based on a sound sample, retrieve a hearing aid profile from the computing device using the hearing aid profile ID, and apply the hearing aid profile to modulate an audio output signal.

31 Claims, 3 Drawing Sheets

(56) References Cited

U.S. PATENT DOCUMENTS

| | | | | |
|---|---|---|---|---|
| 5,608,803 | A | 3/1997 | Magotra et al. | |
| 5,706,351 | A * | 1/1998 | Weinfurtner | 381/314 |
| 5,721,783 | A | 2/1998 | Anderson | |
| 5,727,070 | A | 3/1998 | Coninx | |
| 5,838,806 | A * | 11/1998 | Sigwanz et al. | 381/312 |
| 6,078,675 | A | 6/2000 | Bowen-Nielsen et al. | |
| 6,240,192 | B1 * | 5/2001 | Brennan et al. | 381/314 |
| 6,741,712 | B2 | 5/2004 | Bisgaard | |
| 7,010,133 | B2 | 3/2006 | Chalupper | |
| 7,167,571 | B2 | 1/2007 | Bantz et al. | |
| 7,324,650 | B2 | 1/2008 | Fischer | |
| 7,451,256 | B2 | 11/2008 | Hagen | |
| 7,519,194 | B2 | 4/2009 | Niederdränk et al. | |
| 7,529,545 | B2 | 5/2009 | Rader et al. | |
| 7,715,576 | B2 | 5/2010 | Ribic | |
| 7,764,798 | B1 * | 7/2010 | Prather | H04R 25/554 381/23.1 |
| 7,787,647 | B2 | 8/2010 | Hagen et al. | |
| 7,826,631 | B2 | 11/2010 | Fischer | |
| 7,853,028 | B2 | 12/2010 | Fischer | |
| 7,933,419 | B2 | 4/2011 | Roeck et al. | |
| 8,379,871 | B2 | 2/2013 | Michael et al. | |
| 8,457,335 | B2 | 6/2013 | Imamura et al. | |
| 8,526,649 | B2 | 9/2013 | Foo et al. | |
| 8,538,049 | B2 | 9/2013 | Apfel et al. | |
| 8,611,570 | B2 | 12/2013 | Neumeyer et al. | |
| 8,649,538 | B2 | 2/2014 | Apfel et al. | |
| 8,654,999 | B2 | 2/2014 | Mindlin et al. | |
| 8,761,421 | B2 | 6/2014 | Apfel et al. | |
| 8,787,603 | B2 | 7/2014 | Fichtl et al. | |
| 8,810,392 | B1 | 8/2014 | Teller et al. | |
| 9,191,756 | B2 | 11/2015 | Neumeyer et al. | |
| 2003/0008659 | A1 | 1/2003 | Waters et al. | |
| 2003/0059076 | A1 | 3/2003 | Martin et al. | |
| 2003/0215105 | A1 | 11/2003 | Sacha et al. | |
| 2004/0059446 | A1 | 3/2004 | Goldberg et al. | |
| 2005/0036637 | A1 | 2/2005 | Janssen et al. | |
| 2005/0078845 | A1 | 4/2005 | Aschoff et al. | |
| 2005/0281424 | A1 | 12/2005 | Rass | |
| 2006/0182294 | A1 | 8/2006 | Grasbon et al. | |
| 2006/0198530 | A1 | 9/2006 | Fischer et al. | |
| 2007/0093195 | A1 | 5/2007 | Holmes et al. | |
| 2007/0098195 | A1 | 5/2007 | Holmes | |
| 2007/0255435 | A1 | 11/2007 | Cohen et al. | |
| 2008/0240477 | A1 | 10/2008 | Howard et al. | |
| 2009/0074215 | A1 | 3/2009 | Schumaier | |
| 2009/0103742 | A1 | 4/2009 | Ribic | |
| 2009/0185704 | A1 * | 7/2009 | Hockley | G10L 17/26 381/316 |
| 2009/0196448 | A1 | 8/2009 | Schumaier | |
| 2010/0027822 | A1 | 2/2010 | Dietz et al. | |
| 2010/0054511 | A1 | 3/2010 | Wu et al. | |
| 2010/0254540 | A1 * | 10/2010 | Bang | H04M 1/6016 381/60 |
| 2010/0255782 | A1 | 10/2010 | Klemmensen et al. | |
| 2010/0273452 | A1 | 10/2010 | Rajann et al. | |
| 2011/0176697 | A1 * | 7/2011 | Apfel | H04R 25/305 381/314 |
| 2011/0200214 | A1 * | 8/2011 | Knox | H04R 25/50 381/314 |
| 2012/0177212 | A1 * | 7/2012 | Hou | H04R 25/70 381/60 |

OTHER PUBLICATIONS

American Heritage Dictionary of the English Language, 5th edition; 2011, p. 1652. Exhibit 1011, Case IPR2017-00783.

Aug. 16, 2013 Response to Jun. 4, 2013 Office Action in Prosecution History of U.S. Pat. No. 8,611,570, 9 pages. Exhibit 1004, Case IPR2017-00367.

Barron's Dictionary of Computer and Internet Terms, 11th edition, 2013, p. 457. Exhibit 1012, Case IPR2017-00783.

Certified English language translation of German Patent Publication No. DE19542961, May 15, 1997, 16 pages. Exhibit 1009, Case IPR2017-00781.

Certified English language translation of WIPO Patent Publication No. WO2009/001559 to Imamura et al., Dec. 31, 2008, 79 pages. Exhibit 1006, Case IPR2017-00367.

Consumer Reports, "Hear Well in a Noisy World—features at a glance," Jul. 2009, 2 pages. Exhibit 1009, Case IPR2017-00414.

Declaration of Dr. Les Atlas, Exhibit 1008, Case IPR2017-00781. Jan. 26, 2017, 145 pages.

Declaration of Dr. Robert E. Morley, Jr., Exhibit 1002, Case IPR2017-00496. Dec. 21, 2016, 87 pages.

Declaration of Dr. Robert K. Morrow, Exhibit 1003, Case IPR2017-00783. Jan. 27, 2017, 85 pages. Exhibit 1003, Case IPR2017-00783.

Declaration of Dr. Sayfe Kiaei, Exhibit 1002, Case IPR2017-00367. Dec. 4, 2016; 102 pages.

Declaration of Les Atlas PhD, Exhibit 1003, Case IPR2017-00414. Dec. 6, 2016, 111 pages.

Dillon et al., "The trainable hearing aid: What will it do for clients and clinicians?" The Hearing Journal, vol. 59, No. 4, Apr. 2006, 6 pages. Exhibit 1014, Case IPR2017-00781.

Jul. 10, 2013 Response to May 30, 2013 Office Action in Prosecution History of U.S. Pat. No. 8,761,421, 13 pages. Exhibit 1008, Case IPR2017-00496.

Kasoff, B., "A Closer Look: The Evolution of the Smart Phone," Sep. 19, 2014, 2 pages. <blog.wipp.org/2014/09/a-closer-look-the-evolution-of/> Exhibit 1016, Case IPR2017-00783.

Keidser, Gitte et al., "Variation in preferred gain with experience for hearing-aid users," 2008, International Journal of Audiology 47:10, 621-635. Exhibit 1013, Case IPR2017-00781.

Mar. 1, 2013 Response to Dec. 12, 2012 Office Action in Prosecution History of U.S. Pat. No. 8,761,421, 22 pages. Exhibit 1006, Case IPR2017-00496.

Martin, T., "The evolution of the smartphone," Jul. 29, 2014, 20 pages. <pocketnow.com/2014/07/28/the-evolution-of-the-smartphone> Exhibit 1014, Case IPR2017-00783.

Mukherjee, S., "Smartphone Evolution: From IBM Simon to Samsung Galaxy S3," May 8, 2012, p. 3. <ibtimes.com/smartphone-evolution-ibm-simon-samsung-galaxy-s3-697340> Exhibit 1015, Case IPR2017-00783.

Prosecution History of U.S. Pat. No. 8,649,538 to Apfel et al., 166 pages; patent application filed Feb. 8, 2011. Exhibit 1002, Case IPR2017-00414.

Prosecution History of U.S. Pat. No. 8,654,999 to Mindlin et al., 194 pages; patent application filed Apr. 12, 2011. Exhibit 1002, Case IPR2017-00781.

Prosecution History of U.S. Pat. No. 9,191,756 to Neumeyer et al., 71 pages; patent application filed Dec. 7, 2012. Exhibit 1002, Case IPR2017-00783.

Rodriguez, Gary P. et al. "Preferred Hearing Aid Response Characteristics Under Acoustic and Telecoil Coupling Conditions," American Journal of Audiology55, Nov. 1993, 5 pages. Exhibit 1011, Case IPR2017-00414.

Sager, I., "Before IPhone and Android Came Simon, the First Smartphone," Jun. 29, 2012, 3 pages. <bloomberg.com/news/articles/2012-06-29/before-iphone-and-android-came-simon-the-first-smartphone> Exhibit 1013, Case IPR2017-00783.

United States Patent and Trademark Office, Dec. 12, 2012 Office Action from Prosecution History of U.S. Pat. No. 8,761,421, 19 pages. Exhibit 1003, Case IPR2017-00496.

United States Patent and Trademark Office, Jun. 4, 2013 Office Action from Prosecution History of U.S. Pat. No. 8,611,570, 6 pages. Exhibit 1003, Case IPR2017-00367.

United States Patent and Trademark Office, May 30, 2013 Office Action from Prosecution History of U.S. Pat. No. 8,761,421, 19 pages. Exhibit 1007, Case IPR2017-00496.

United States Patent and Trademark Office, Patent Trial and Appeal Board, *K/S HIMPP* v. *III Holdings 4, LLC,* Case IPR2017-00367 (U.S. Pat. No. 8,611,570), Petition for inter Partes Review, Dec. 6, 2016, 81 pages.

United States Patent and Trademark Office, Patent Trial and Appeal Board, *K/S HIMPP* v. *III Holdings 4, LLC,* Case IPR2017-00414 (U.S. Pat. No. 8,649,538), Petition for Inter Partes Review, Dec. 6, 2016, 84 pages.

(56) References Cited

OTHER PUBLICATIONS

United States Patent and Trademark Office, Patent Trial and Appeal Board, *K/S HIMPP* v. *III Holdings 4, LLC,* Case IPR2017-00496 (U.S. Pat. No. 8,761,421), Petition for Inter Partes Review, Dec. 21, 2016, 91 pages.
United States Patent and Trademark Office, Patent Trial and Appeal Board, *K/S HIMPP* v. *III Hoidings 4, LLC,* Case IPR2017-00781 (U.S. Pat. No. 8,654,999), Petition for Inter Partes Review of claims 1-9 and 16-19, Jan. 27, 2017, 69 pages.
United States Patent and Trademark Office, Patent Trial and Appeal Board, *K/S HIMPP* v. *III Holdings 4, LLC,* Case IPR2017-00782 (U.S. Pat. No. 8,654,999), Petition for Inter Partes Review of claims 10-15 and 20, Jan. 27, 2017, 56 pages.
United States Patent and Trademark Office, Patent Trial and Appeal Board, *K/S HIMPP* v. *III Holdings 4, LLC,* Case IPR2017-00783 (U.S. Pat. No. 9,191,756), Petition for Inter Partes Review, Jan. 27, 2017, 79 pages.
Valente, Michael, "Guideline for Audiology, Management of the Adult Patient," Audiology Online 2016, Oct. 30, 2006, 8 pages. Exhibit 1011, Case IPR2017-00781.
Widrow, Bernard et al. "Microphone Arrays for Hearing Aids: An Overview," Journal of Speech Communication, Jan. 2003, pp. 139-146. Exhibit 1010, Case IPR2017-00414.
Resound Alera: End User Instructional Brochure, M101100-GB-10.02 Rev.A; GN ReSound Group, USA, 2010, 7 pages.
United States Patent and Trademark Office, Restriction Requirement, U.S. Appl. No. 13/024,309, dated Nov. 9, 2012; 5 pages.
United States Patent and Trademark Office, Non-Final Office Action, U.S. Appl. No. 13/024,309, dated Feb. 20, 2013, 7 pages.
United States Patent and Trademark Office, Notice of Allowance, U.S. Appl. No. 13/024,309, dated May 17, 2013, 7 pages.
IPR2017-00367; U.S. Pat. No. 8,611,570, Dec. 6, 2016, Data Storage System, Hearing Aid, and Method of Selectively Applying Sound Filters.
IPR2017-00414; U.S. Pat. No. 8,649,538, Dec. 6, 2016, Hearing Aid Having Multiple Sound Inputs and Methods Therefor.
IPR2017-00781; U.S. Pat. No. 8,654,999, Jan. 27, 2017, System and Method of Progressive Hearing Device Adjustment.
IPR2017-00782; U.S. Pat. No. 8,654,999, Jan. 27, 2017, System and Method of Progressive Hearing Device Adjustment.
IPR2017-00496 U.S. Pat. No. 8,761,421, Dec. 21, 2016, Portable Electronic Device and Computer-Readable Medium for Remote Hearing Aid Profile Storage.
IPR2017-00783; U.S. Pat. No. 9,191,756, Jan. 27, 2017, System and Method for Locating a Hearing Aid.

* cited by examiner

HEARING AID, COMPUTING DEVICE, AND METHOD FOR SELECTING A HEARING AID PROFILE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION(S)

This application *is a reissue application for U.S. Pat. No. 8,538,049, issued from U.S. patent application Ser. No. 13/024,309, filed Feb. 9, 2011, which* is a non-provisional patent application of and claims priority from U.S. Provisional Patent Application No. 61/304,390 entitled "Hearing Aid Including Hearing Aid Profile Selection Logic and Remote Storage," and filed on Feb. 12, 2010[, which is]. *The foregoing applications are* incorporated herein by reference in [its entirety] *their entireties*.

FIELD

This disclosure relates generally to hearing aids, and more particularly, to hearing aids configured to communicate with a computing device and methods for selecting a hearing aid profile.

BACKGROUND

Hearing deficiencies can range from partial to complete hearing loss. Often, an individual's hearing ability varies across the range of audible sound frequencies, and many individuals have hearing impairment with respect to only some acoustic frequencies. For example, an individual's hearing loss may be greater at higher frequencies than at lower frequencies.

Hearing aids have been developed to compensate for hearing losses in individuals. Conventionally, hearing aids range from ear pieces configured to amplify sounds to configurable hearing devices offering adjustable operational parameters that can be configured by a hearing specialist to enhance the performance of the hearing aid. Parameters, such as volume or tone, often can be adjusted, and many hearing aids allow for the individual users to adjust these parameters.

However, such hearing aids generally do not permit the user to adjust other parameters or response characteristics, including, signal amplitude and gain characteristics, and parameters associated with signal processing algorithms, including signal frequency transforms. Instead, a hearing health professional can adjust the hearing aid, by taking measurements using calibrated and specialized equipment to assess an individual's hearing capabilities in a variety of sound environments, and then by adjusting the hearing aid based on the calibrated measurements. Subsequent adjustments, other than adjustments to volume or tone, can require a second visit to and further calibration by the hearing health professional, which visit can be costly and time intensive.

In some instances, the hearing health professional may create multiple hearing profiles for the user for use in different sound environments. Such hearing profiles represent a combination of a sound-shaping algorithms and associated coefficients for providing a customized audio compensation for the user.

Unfortunately, merely providing multiple stored hearing profiles to the user may be insufficient to provide a satisfactory hearing experience. In particular, the limited number of such hearing aid profiles may not take into account the variety of acoustic frequencies and amplitudes of a particular acoustic environment of the user. Thus, in some instances, it is possible that none of the various stored hearing aid profiles will accurately reflects the user's actual acoustic environment. Alternatively, even if an appropriate profile is available, the user may not know that a more suitable hearing aid profile is available for the particular acoustic environment and/or the user may make a less than ideal selection by choosing the wrong hearing aid profile for the particular acoustic environment.

In higher end (higher cost) hearing aid models, sometimes logic is incorporated that can select between stored hearing aid profiles. Since robust processors consume significant battery power, such logic may consume power and reduce battery life. Accordingly, hearing aid manufacturers often choose lower-end and lower-cost processors that consume less power but also have less processing power, which may be insufficient to reliably characterize the acoustic environment in order to make an appropriate selection.

DETAILED DESCRIPTION OF ILLUSTRATIVE EMBODIMENTS

Embodiments of a hearing aid are described below that include a microphone adapted to convert sounds into sound-related signals, a processor coupled to the microphone and adapted to modulate the sound-related signals, and a speaker to reproduce the modulated signals as an audible output at or within the ear canal of a user. The processor applies a hearing aid profile to shape the sound-related signals to produce the modulated output signal that is adjusted to compensate for the user's hearing deficiency. By compensating the output signal for the user's hearing deficiency, playback by a speaker of the hearing aid produces an audible sound that is compensated for the user's hearing deficit.

The hearing aid further includes a radio frequency (RF) transceiver coupled to the processor and adapted to selectively communicate with a remote computing device through a wireless communication channel. The processor is configured to selectively update the hearing aid profile of the hearing aid by retrieving a new hearing aid profile (as needed) from the computing device through the wireless communication channel. By offloading the storage of at least some of the available hearing aid profiles, a storage capacity of a memory of the hearing aid may be kept small while still providing a wide-selection of hearing aid profiles suitable for different acoustic environments.

In some instances, the hearing aid captures audio samples of the acoustic environment and determines when a new hearing aid profile is needed based on the audio samples. In an example, the hearing aid can reduce the audio sample to a value and compare the value to a threshold. When the value exceeds the threshold for a period of time, the hearing aid determines that a new hearing aid profile is needed. In a particular example, the value can be used to identify a better hearing aid profile from a set of hearing aid profiles using a look up table including comparison values and corresponding hearing aid profile identifiers. By reducing the hearing aid profile selection to a lookup in a table, both the processing power and the data storage capacity of the hearing aid can be kept relatively low, allowing for reduced power consumption, thereby enhancing the battery-life of the hearing aid, without limiting the number of available hearing aid profiles and without sacrificing the user's acoustic experience. Embodiments disclosed below provide systems and methods of storing, identifying and using a variety of hearing aid profiles stored within a memory of a hearing aid and/or within a memory of the computing device communicatively coupled to the hearing aid.

Figure 1:
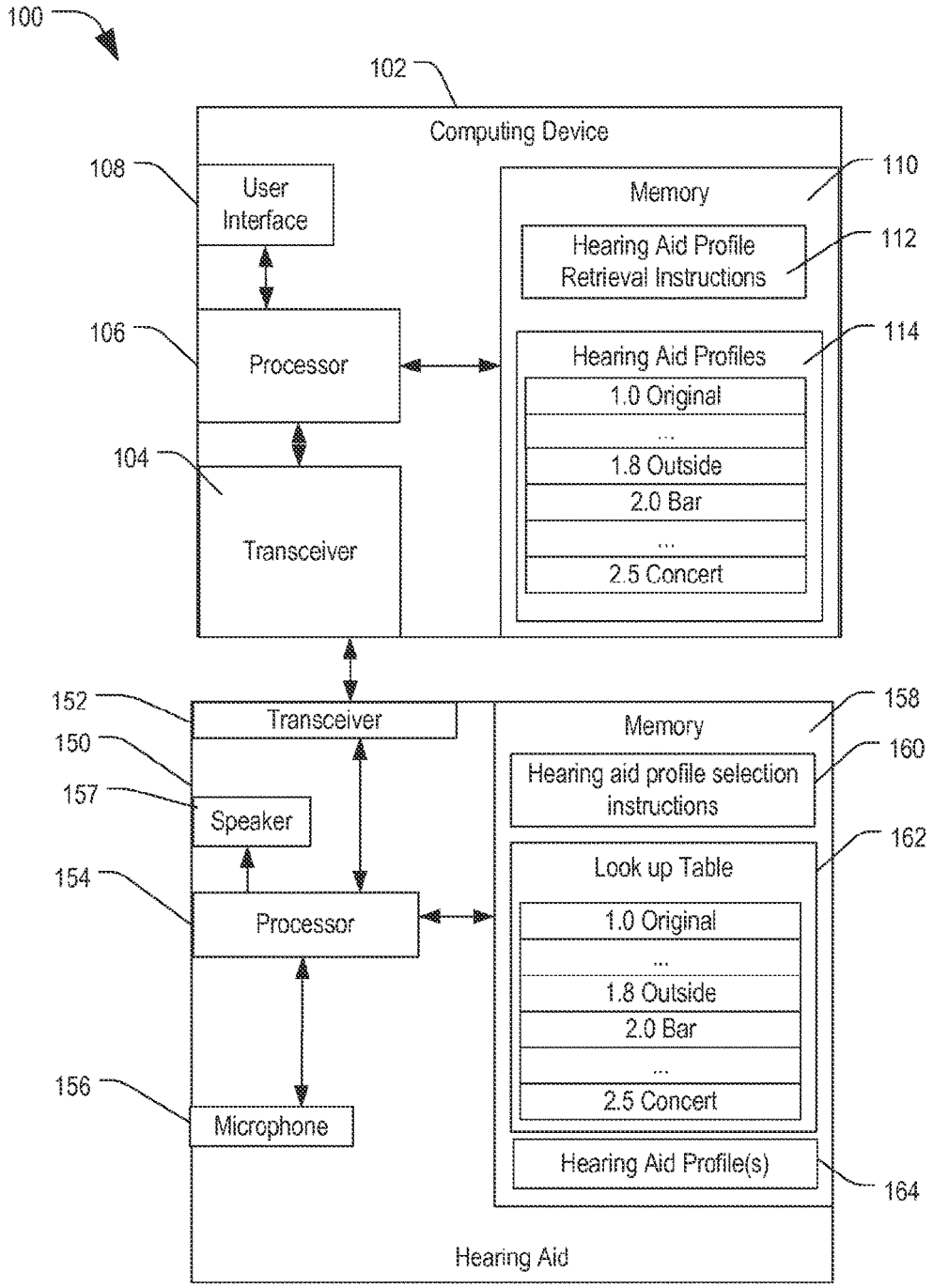
FIG. 1 is a block diagram of an embodiment of a system including a hearing aid and a computing device adapted to store a plurality of hearing aid profiles.

FIG. 1 is a block diagram an embodiment of a system 100 including a hearing aid 150 and a computing device 102 adapted to store a plurality of hearing aid profiles. Hearing aid 150 includes a transceiver 152 that is configured to communicate with computing device 102 through a wireless communication channel. Transceiver 152 is configured to send and receive radio frequency signals, such as short range wireless signals, including Bluetooth® protocol signals, IEEE 802.11x family protocol signals, or other standard or proprietary wireless protocol signals. Hearing aid 150 also includes a processor 154 connected to transceiver 152 and to a memory device 158.

Hearing aid 150 further includes a microphone 156 connected to processor 154 and configured to convert sounds into electrical signals. Microphone 156 provides the electrical signals to processor 154, which shapes the electrical signals according to a selected hearing aid profile associated with the user to produce a modified (modulated) output signal that is customized to compensate the user's particular hearing deficit and optionally for the particular acoustic environment. As used herein, the term "hearing aid profile" refers to a collection of acoustic configuration settings for hearing aid 150, which are used by processor 154 to shape acoustic signals to compensate for the user's hearing deficit. In addition to volume and tone, the acoustic configuration settings can include directionality adjustments to focus the directionality of microphone 156 by filtering other sounds based on their corresponding sound pressure for example. Further, the acoustic configuration settings can include noise-filtering features that may utilize signal-to-noise ratios, sound pressure, and other acoustic features to modulate the audible output. Additionally, the hearing aid profile may include frequency specific gain adjustments and filters to compensate for the user's hearing deficit and optionally to reduce undesired background noise.

Memory device 158 stores instructions that are executable by processor 154, including at least one hearing aid profile 164 including instructions that, when executed by processor 154, cause processor 154 to shape the electrical signals to produce the modified output signal, which can be reproduced as an audible signal for the user via a speaker 157. Memory device 158 stores hearing aid profile selection instructions 160 and a lookup table 162 including one or more hearing aid profile identifiers (IDs). As used herein, the term "hearing aid profile ID" refers to an identifier associated with a particular hearing aid profile for hearing aid 150, such as a serial number, a memory location, a name, other data, or some combination thereof, which can be sent to computing device 102 as part of a trigger/request to uniquely identify a hearing aid profile. In a particular example, the hearing aid profile ID can be a multi-part ID stored in a look up table in memory 158 for providing context-based selection of hearing aid profiles for the current acoustic environment. Each hearing aid profile ID uniquely identifies one of a plurality of hearing aid profiles. Further, each hearing aid profile ID is associated with one or more parameters or values (sometimes referred to as "usability values") and other data associated with an acoustic environment for which the hearing aid profile is appropriate. In some instances, the hearing aid profile ID further includes a memory address identifying a location in memory where the hearing aid profile is stored. In an example, the look-up table may specify a memory address within memory 158 of the hearing aid where hearing aid profile 164 is stored. In other instances, the look-up table 162 may specify a memory address within a memory of computing device 102 (such as memory 110).

The usability value of the hearing aid profile ID represents one or more values (or, in some instances, a vector), which can be used to determine a suitable hearing aid profile from a plurality of hearing aid profiles for a particular acoustic environment. The value may represent a frequency content range, an average amplitude range, an average background noise range, a peak amplitude, a vector, a compressed value derived from a number of characteristics, one or more other values, or any combination thereof. The usability value may also include sound pressure and/or durational information. In an example, the usability value could be a frequency range derived from frequency content of the acoustic environment for which the hearing aid profile is appropriate. When the hearing aid profile is created or used, a microphone, such as microphone 156, can be used to capture a series of sound samples of the acoustic environment, which sound samples may be characterized to generate the suitability values for the hearing aid profile. Such sound samples provide a "snap shot" of the acoustic environment appropriate for the particular hearing aid profile. In an example, hearing aid 150 may communicate such "snap shots" to computing device 102 for further processing.

Computing device 102 can be any electronic device having a processor capable of executing instructions, a memory for storing data (such as hearing aid profiles), and a transceiver capable of communicating with hearing aid 150. Examples of computing device 102 include a personal digital assistant (PDA), a smart phone, a portable computer, or another data processing device. The Apple iPhone®, which is commercially available from Apple, Inc. of Cupertino, Calif., is an example of a suitable computing device 102. Another representative example is a Blackberry® phone, available from Research In Motion Limited of Waterloo, Ontario Canada. Other types of mobile computing devices with short range wireless capability can also be used.

Computing device 102 includes a processor 106 connected to a memory 110. Computing device 102 further includes a transceiver device 104 connected to processor 106 for sending data to and receiving data from transceiver device 152 of hearing aid 150 through the wireless communication channel. Computing device 102 may also include a speaker and a microphone (not shown).

Memory 110 stores a plurality of instructions that are executable by processor 106, such as hearing aid profile retrieval instructions 112 and stores a plurality of hearing aid profiles 114. Memory 110 may also store other instructions, such as operating system instructions, instructions for creating or modifying hearing aid profiles, instructions for identifying a suitable hearing aid profile, alerting instructions, and so on. Each of the hearing aid profiles 114 stored in memory 110 are based on the user's hearing characteristics (the user's particular hearing deficiencies) and are designed for execution by processor 154 of hearing aid 102 to compensate for the user's hearing loss or to otherwise shape sound-related signals that are reproduced by speaker 157 within hearing aid 150. Each of the hearing aid profiles 114 includes one or more parameters that can be applied to shape or otherwise adjust the sound-related signals for a particular acoustic environment to produce a modified output signal for playback by speaker 157. In addition to overall adjustments to volume and tone, such sound-shaping adjustments can include frequency-specific adjustments and active filtering. Preferably, the modified output signal is shaped so as to enhance the user's listening experience, by compensating the audio signal for the user's hearing deficiency and optionally by adjusting the audio signal to filter undesirable audio content from the acoustic environment.

Each of the hearing aid profiles includes one or more parameters that can be configured by the user or by an audiologist to customize the sound shaping and to adjust the response characteristics of hearing aid 150, allowing signal processor 154 to apply a customized hearing aid profile to a sound-related signal to compensate for hearing deficits of the user. Such parameters can include signal amplitude and gain characteristics, signal processing algorithms, frequency response characteristics, coefficients associated with one or more signal processing algorithms, or any combination thereof. Further, such adjustments can include directional adjustments to adjust the directionality of the microphone's reception of sounds by filtering the electrical signals so as to remove or suppress the amplitude of peripheral sounds.

In an embodiment, hearing aid 150 detects when sounds captured by microphone 156 exceed a threshold indicating that a different hearing aid profile would be more suitable for the particular acoustic environment than the hearing aid profile currently being applied by processor 154 to shape the audio signal. In an example, hearing aid 150 periodically samples the sound-related electrical signals and compares parameters associated with each sample to at least one baseline parameter. When one or more parameters of a sample differ from the baseline by an amount greater than a threshold, hearing aid 150 begins the hearing aid profile selection process by executing hearing aid profile selection instructions 160. The threshold may be a frequency difference threshold, an amplitude difference threshold, a background noise threshold, a time threshold, or any combination thereof. The time threshold may represent a period of time over which the parameter differs from the baseline by more than a pre-determined amount, which time period is exceeded before the hearing aid profile selection process is initiated. In an embodiment, the threshold amounts and types can be selected and modified by the user.

In general, the threshold represents a difference that is significant enough to justify switching to another hearing aid profile. As a user moves around, sounds may temporarily intrude on the user's listening experience, such as when an outside door to a busy street opens and closes. The threshold prevents such intrusions from causing the hearing aid to switch hearing aid profiles unnecessarily, such as by requiring the intrusion to last for a period of time before switching.

As used herein, the term "sound sample" refers to a digital representation of the user's current acoustic environment derived from the electrical signals produced by a microphone, such as microphone 156. In an example, microphone 156 captures analog sound from the user's environment and converts the analog sound into an analog electrical signal, which is sampled to produce sound samples. Such sound samples can be captured periodically, randomly, or in response to a trigger. In some instances, the sound sample may be processed to produce a digital value or a vector representing the acoustic environment at a point in time.

The trigger may be a user-initiated trigger, a trigger from processor 154 (for example, based on a period of time or a scheduled event), or a trigger based on a signal received from computing device 102. The sound-related electrical signal is converted to a digital signal by an analog-to-digital converter (not shown) or a sample-and-hold circuit (not shown) to produce a sound sample that consists of a digital representation of the acoustic environment. As use herein, the term "baseline" is a stored sound sample, a digital value, or vector representative of a "snap shot" of an acoustic environment. In a particular example, the baseline may be a stored sample or a digital value representative of the user's most recent acoustic environment. In some instances, rather than storing a sound sample, the sound sample may be interpolated to produce a statistically relevant or unique digital value that can be used to represent the acoustic environment of the user.

If processor 154 of hearing aid 150 determines that the difference between the sound sample and the baseline exceeds the threshold, then processor 154 detects a change in the acoustic environment that differs from the acoustic environment for which the current hearing aid profile was originally selected. In particular, processor 154 detects a difference that is sufficiently different (that has a suitable margin or difference) to justify changing the hearing aid profile. When the difference exceeds the threshold, processor 154 executes hearing aid profile selection instructions 160 to begin a hearing aid profile selection process. The hearing aid profile selection instructions 160 cause processor 154 to compare the sound sample (or a value derived from the sound sample) to values in lookup table 162 stored in a look-up table in memory 158. Hearing aid 150 may identify one or more of the hearing aid profiles having an associated hearing aid ID with a value that substantially matches that of the sound sample (for example, that differs from the sound sample by less than the threshold). Alternatively, processor 154 may iteratively compare the sound sample to each value in lookup table 162 to select a best fit hearing aid profile. In some instances, the values in lookup table 162 may represent multiple parameters of a previously recorded sound sample, and the best fit may be based on a comparison of corresponding parameters of the current sound sample relative to those of the previously recorded sound sample. In other instances, processor 154 may determine suitability of one or more hearing aid profiles by determining if the values derived from the sound sample fall within threshold ranged included in the values in the look-up table. For example, the values in the look-up table may include frequency ranges for which the values derived from the sound sample are suitable if they fall within the ranges.

Once hearing aid 150 has identified at least one hearing aid profile ID from lookup table 162 that is acceptable for the current acoustic environment, processor 154 retrieves and applies the identified hearing aid profile. If the identified hearing aid profile is stored in memory 158, processor 154 retrieves it from hearing aid profiles 164 in memory 158 and applies it to shape subsequently received sound-related signals. If the identified hearing aid profile is stored in hearing aid profiles 114 of memory 110 within computing device 102, processor 154 uses transceiver 152 to send a request to computing device 102 that includes the hearing aid profile ID to retrieve the hearing aid profile from memory 110 of computing device 102. Alternatively, processor 154 may not identify an acceptable hearing aid profile ID. If processor 154 is unable to locate a suitable hearing aid profile ID, processor 154 uses transceiver 152 to send an alert to computing device 102 including data related to the sound-related signal, such that computing device 102 may utilize the data to select or generate a suitable hearing aid profile for the current acoustic environment.

Once computing device 102 the request, retrieves the hearing aid profile associated with the hearing aid profile ID from hearing aid profiles 114, and sends the hearing aid profile that matches the hearing aid profile ID to hearing aid 150 through the communication channel. Once hearing aid 150 receives the requested hearing aid profile from computing device 102, processor 154 will apply it to shape sounds from microphone 156. When hearing aid 150 receives the requested hearing aid profile, it may store the received hearing aid profile in memory 158, replacing or supplementing one or more hearing aid profiles 164 already stored in memory 158.

In a particular example, computing device 102 receives the request including the hearing aid profile ID at transceiver 104 and provides the hearing aid profile ID (a unique identifier) to processor 106, which executes hearing aid profile retrieval instructions 112 to retrieve the hearing aid profile corresponding to a hearing aid profile ID from hearing aid profiles 114. Once processor 106 has retrieved the hearing aid profile, processor 106 sends the hearing aid profile to hearing aid 150 through the communication channel via transceiver 104.

By utilizing a look-up table 162, hearing aid 150 store data about many more hearing aid profiles than memory 158 has the capacity to store. In particular, memory 110 may have significantly more storage capacity than memory 158 of hearing aid 150. Thus, the number of hearing aid profiles that can be stored and used by the hearing aid system 100 can be greatly increased, as compared to hearing aid devices that store a small number of profiles internally in a memory of the hearing aid itself. Further, logic within hearing aid 150 can be used to retrieve a different hearing aid profile, as needed, providing the user with a much more enjoyable and individually tailored hearing experience.

In this example, processor 154 or a microcontroller may be configured to power on or off transceiver 152, as necessary to conserve battery life. Transceiver 152 is configured such that it is not required to continually search for a signal or to be active at all times. Batteries in hearing aids are typically small because size is a primary design feature for hearing aids. Many transceivers, such as a Bluetooth® transceiver, consume power rapidly and would quickly deplete a battery in hearing aid 150. Processor 154 activates transceiver 152 when necessary to communicate with computing device 102. In this manner transceiver 152 is only active during the time starting when hearing aid 150 sends a request to computing device 102 and ending when hearing aid 150 receives the hearing aid profile from computing device 102. In this manner transceiver 152 is not always on and consuming precious battery power allowing hearing aid 150 to operate for extended periods of time.

In one embodiment, processor 154 may create a hearing aid profile ID for each hearing aid profile when it is created. In an example, processor 154 may collect a series of sound samples using microphone 156. The series of sound samples can then be utilized to determine the frequency content of the acoustic environment appropriate for the hearing aid profile, capturing a range of acceptable frequencies, amplitudes, background noise levels, and other parameters of the acoustic environment. The sound samples may be processed to reduce the sound samples to their frequency content, and then the frequency content of each sound sample could be further processed to determine the frequency range parameter. In another embodiment, the amplitude of each sound sample could be determined, and then a range of suitable amplitudes could be determined from the amplitude data, creating an acceptable range for the amplitude. A similar process could be used to determine the background noise, and then to create an acceptable background noise average range. In particular, known audio signals can be provided to processor 154 for modulation using a selected hearing aid profile. The resulting modulated signal can be used to derive the various ranges or other values. The resulting range or other values can be provided to computing device 102 and stored in memory 110 with the hearing aid profiles 114, and the range or other values and the associated hearing aid profile ID of the hearing aid profile can be uploaded to the lookup table in memory 158 of hearing aid 150 through the wireless communication channel.

In an alternative embodiment, hearing aid 150 may provide the sound samples to computing device 102 when one or more parameters exceed a threshold. In this instance, processor 106 of computing device 102 processes the sound samples and identifies an appropriate hearing aid profile for the hearing aid 150 based on the sound samples. In this instance, memory 110 may include a lookup table, such as lookup table 162, which can be used to identify a suitable hearing aid profile in response to receiving the sound sample from hearing aid 150. Once identified, computing device 102 provides the hearing aid profile to hearing aid 150 to update the selected hearing aid profile of hearing aid 150.

In operation, any one value or range of values could be used as part of a usability value to compare with parameters of a given sound sample of the user's current acoustic environment by processor 154 executing hearing aid profile selection instructions to determine an appropriate hearing aid profile. Processor 154 can then produce the request including the hearing aid profile ID for a desired hearing aid profile based on a substantial match between one of the parameters of the given sound sample and one of the values or range of values of a particular one of the hearing aid profiles. In one particular example, a substantial match may be determined by comparing a value associated with or derived from the sound sample to a corresponding value within lookup table 162 to identify a "closest" or "best" match.

It should be understood that system 100 depicted in FIG. 1 makes it possible to retain a large number of customized hearing profiles that can be accessed as needed by the user to configure hearing aid 150. In particular, by storing the hearing aid profiles in memory 110 of computing device 102, a larger storage capacity may be used to host a multitude of hearing aid profiles without having to alter the memory capacity of the hearing aid 150. Further, allowing hearing aid 150 to update the hearing aid profile applied by processor 154 to shape sounds, hearing aid 150 is dynamically configurable during operation as the sound environment changes, without the user having to visit a hearing professional.

Figure 2:
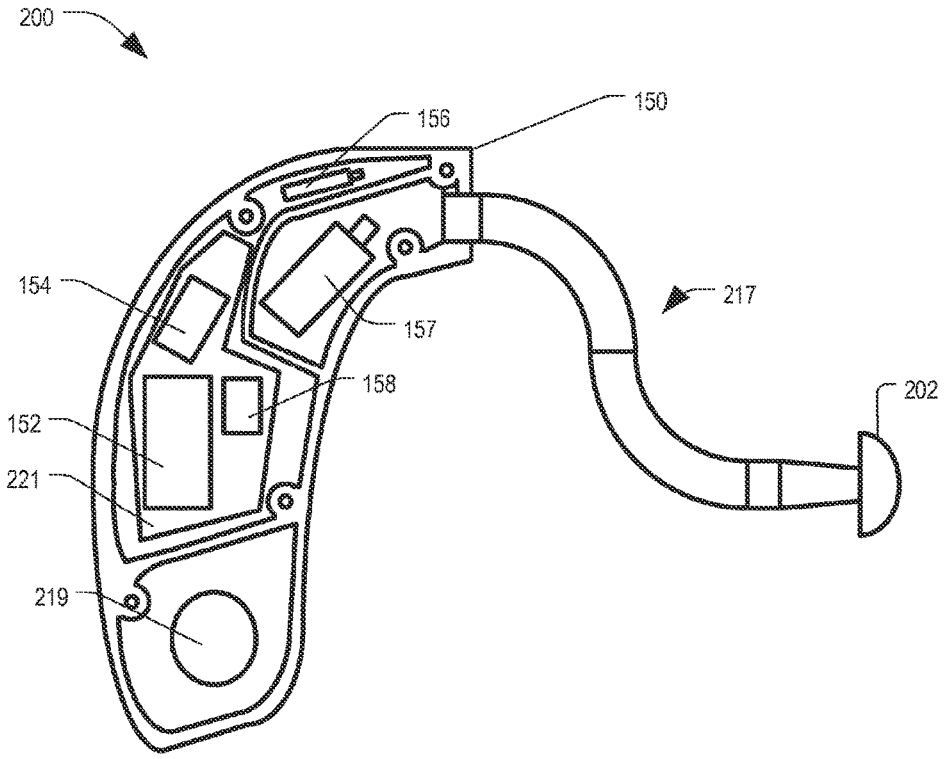
FIG. 2 is a cross-sectional view of a representative embodiment of a hearing aid, such as the hearing aid of FIG. 1, including logic to generate a request for a hearing aid profile from the computing device.

FIG. 2 is a cross-sectional view of one possible representative embodiment 200 of an external hearing aid, which is a representative example of hearing aid 150 in FIG. 1, adapted to select a hearing aid profile. Hearing aid 150 includes a microphone 156 to convert sounds into electrical signals. Microphone 156 is communicatively coupled to circuit board 221, which includes processor 154, transceiver 152, and memory 158. Further, hearing aid 150 includes a speaker 157 coupled to signal processor 154 and configured to communicate audio data through an ear tube 217 to an ear piece 202, which may be positioned within the ear canal of a user's ear. Further, hearing aid 150 includes a battery 219 to supply power to the other components. In an alternative embodiment, speaker 157 may be located within ear piece 202 and ear canal tube 217 can be replaced with a wire for communicating the audio signals from processor 154 to speaker 157.

During operation, microphone 156 converts sounds into electrical signals and provides the electrical signals to signal processor 154, which processes the electrical signals according to a selected hearing aid profile associated with the user to produce a modified output signal that is customized to a user's particular hearing ability. The modified output signal is provided to speaker 157, which reproduces the modified output signal as an audio signal and which delivers the audio signal to the ear of the user.

Further, as discussed above with respect to FIG. 1, hearing aid 150 is configurable to communicate with a remote device, such as computing device 102, through a communication channel to selectively retrieve hearing aid profiles from a memory of the remote device. Processor 154 is adapted to apply the retrieved hearing aid profiles to shape sound signals.

It should be understood that, while the embodiment 200 of hearing aid 150 illustrates an external "wrap-around" hearing device, the user-configurable signal processor 154 can be incorporated in other types of hearing aids, including hearing aids designed to be worn behind the ear or within the ear canal, or hearing aids designed for implantation. The embodiment 200 of hearing aid 150 depicted in FIG. 2 represents only one of many possible implementations with which the user-configurable signal processor may be used.

Figure 3:
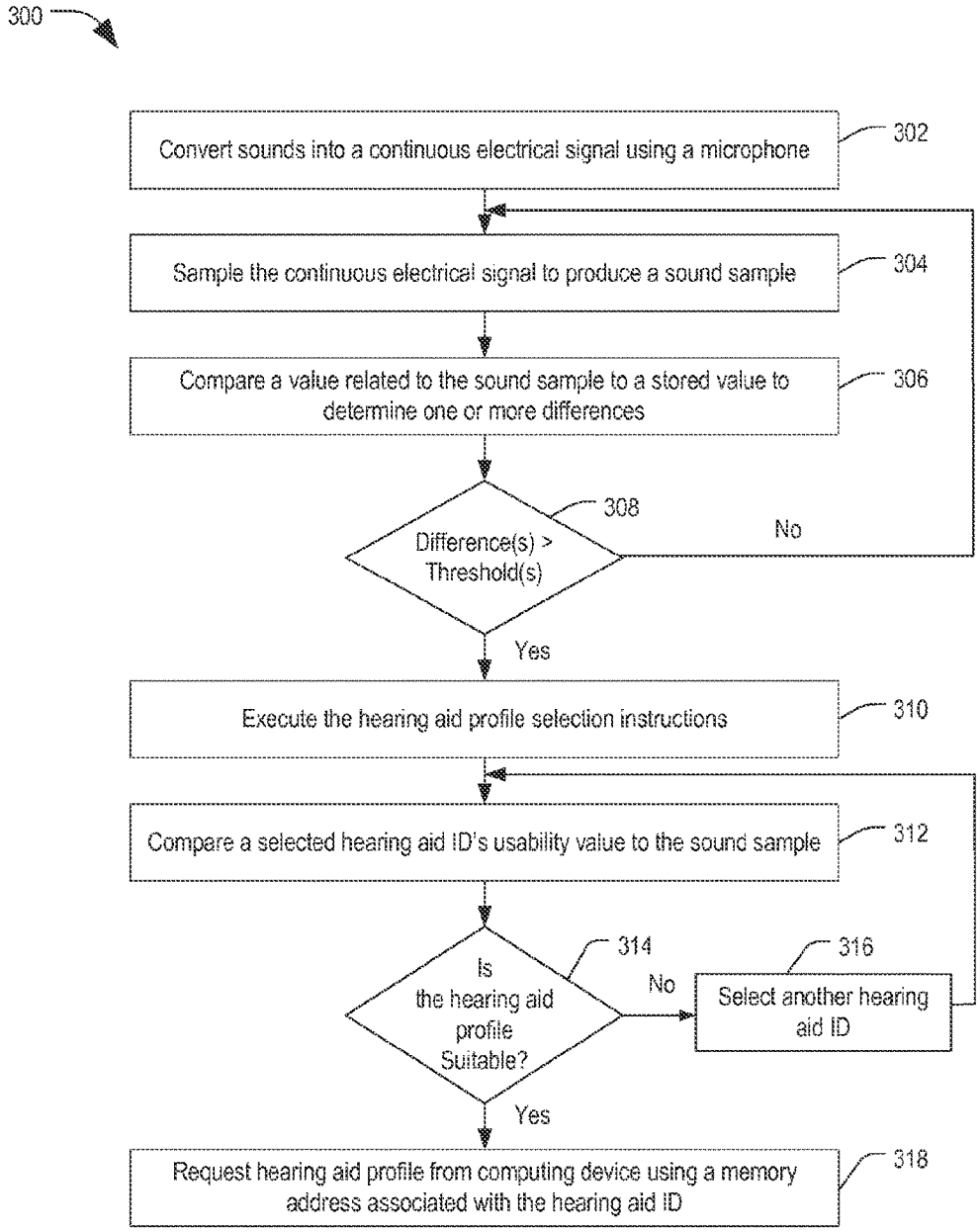
FIG. 3 is a flow diagram of an embodiment of a method of selecting a hearing aid profile from a memory using the system of FIG. 1.

FIG. 3 is a flow diagram of an embodiment of a method 300 of selecting a hearing aid profile from a memory using the system 100 of FIG. 1. In the illustrated embodiment, the method 300 can be performed by hearing aid 150 to generate a request for a hearing aid profile from computing device 102. At 302, sound is converted into a continuous electrical signal using a microphone 156. Advancing to 304, the continuous electrical signal is sampled to produce a sound sample. In one embodiment, the sound sample is produced using an analog-to-digital converter (not shown), creating a digital representation of the sound (i.e., the sound sample). In an alternative embodiment, the electrical signals may be sampled by an analog sample-and-hold circuit. The continuous signal may be sampled periodically, randomly, or in response to a trigger. The trigger may be a user-initiated trigger or an automatically generated trigger. For example, the trigger may be based on a peak amplitude of the continuous electrical signal, which, when it exceeds a threshold, causes the trigger to be generated. In another example, the trigger may be automatically generated based on a sound pressure or other parameter not directly associated with the continuous electrical signal. In still another example, a user may interact with a user interface of computing device 102 to initiate the trigger.

Moving to 306, a value related to the sound sample is compared to a stored value to determine one or more differences. In an example, the value related to the first sample may be a unique value derived from the first sample, such as a statistically unique value, a numeric value representing some combination of parameters associated with the sample, or some other value. In another example, the value may be a vector including one or more parameters derived from a recorded version of the first sample. Proceeding to 308, if the one or more of the differences are less than one or more corresponding thresholds, the method 300 returns to 304 and the continuous electrical signal is sampled to produce another sample.

It should be understood that the corresponding threshold may include more than one threshold value and that block 306 may include a series of threshold comparisons. Further, the result of any one of the comparisons at 306 may be weighted based on a pre-determined importance of any one of the parameters to the overall hearing experience of the user. As such, at 308, in some instances, only one threshold needs to be exceeded to advance to 310. In other instances, multiple thresholds are exceeded before advancing to 310. The threshold sensitivity may be configured by the user through a configuration utility accessible through user interface 108 of computing device 102. Further, threshold sensitivity may vary based on a context associated with the particular hearing aid profile. For example, the background sound at a sporting event or a concert may vary significantly, but it may be undesirable to change the hearing aid profile during such an event unless a time threshold is also exceeded. In such an instance, threshold sensitivity may be reduced or modulated according to a time parameter to ensure that the hearing aid doesn't change from the concert profile to a more sound-sensitive profile too soon.

At 308, if the one or more differences are greater than the corresponding thresholds, the method 300 advances to 310 and processor 154 executes hearing aid profile selection instructions 160. Proceeding to 312, processor 154 compares the usability value of a selected one of the hearing aid ID in lookup table 162 to the value related to the sound sample. Continuing to 314, if the hearing aid profile is not suitable for the sound environment based on the comparison, the method 300 proceeds to 316 and another one of the hearing aid IDs in lookup table 162. The method 300 returns to 312 and the selected hearing aid ID's usability value is compared to the value related to the sound sample. Blocks 312, 314, and 316 may be repeated until a suitable hearing aid profile is determined.

Returning to 314, if, however, the hearing aid profile is suitable for the sound environment, the method 300 advances to 318 and the hearing aid profile is requested from computing device 102 using the hearing aid profile ID. Alternatively, the request provides a name, a numeric value, or some other unique identifier, which can be used by computing device 102 to identify the hearing aid profile.

In this instance, suitability of a particular hearing aid profile may be determined in any of a number of ways. In one instance, the comparison in block 312 may produce a difference value, which can be compared to a threshold to see if the hearing aid profile is within a desired margin of error. In another instance, the comparison in block 312 may produce a quality metric, which can provide an indication of the suitability of the particular hearing aid profile. In still another embodiment, the comparison in block 312 may include applying the hearing aid profile to the sound sample to produce a modified sound output, that is analyzed to determine its suitability, such as by comparing parameters of the modified sound output to a threshold.

It should be understood that usability value may include more than one parameter. For example, the usability value can include an average frequency parameter and an average amplitude parameter. Further, it is contemplated that one or more of the parameters of may be weighted or determinative in either the determination of whether to trigger a hearing aid profile selection process or in the selection process itself. In the illustrated example, the value that is compared to determine the suitability of a hearing aid profile may include multiple parameters, each of which may have to be less than a threshold or within a margin of error of the corresponding threshold amount for the hearing aid profile to be selected as a suitable hearing aid profile.

While the above-examples depict a hearing aid 150 having a single processor 154 configured to shape sounds and to process hearing aid profile selection operations, in alternative embodiments, a separate microcontroller may be provided (which can be included within transceiver 152) for processing hearing aid profile selection operations, for sampling sounds, and for selectively communicating requests/alerts to computing device 102. In one instance, the separate microcontroller may be a microprocessor that can be selectively activated by processor 154 in response to detecting a modulated output signal parameter that exceeds a threshold.

In conjunction with the systems and methods disclosed above with respect to FIGS. 1-3, a hearing aid and an associated computing device are disclosed that are configurable to communicate through a wireless communication channel to provide a customized hearing experience for the user. In particular, the computing device includes a memory that is configured to store a plurality of hearing aid profiles, each of which are designed for execution by a processor of the hearing aid to shape sound-related signals to produce a modified sound signal that compensates for the user's hearing deficits. The hearing aid is configured to detect a change in the acoustic environment and to select a desired hearing aid profile for the acoustic environment from a plurality of hearing aid profile identifiers within a lookup table in a memory within the hearing aid. The hearing aid is further configured to determine a hearing aid profile ID from the lookup table that is associated with the selected hearing aid profile and to send a request to the computing device that includes the hearing aid profile ID for retrieving the selected hearing aid profile from the memory of the computing device. The computing device retrieves the hearing aid profile based on the hearing aid profile ID and provides it to the hearing aid through the communication channel, and the hearing aid applies the hearing aid profile to shape sound-related signals. In an alternative embodiment, the computing device determines the hearing aid profile ID from a lookup table in its memory based on the sound sample.

Embodiments of the hearing aid systems and methods disclosed above provide a mechanism for storing multiple hearing aid profiles on a remote device, which already has available memory so that all of the hearing aid profiles need not be stored within a memory of the hearing aid. However, in some embodiments, a limited number of hearing aid profiles may be stored in the memory of the hearing aid, such as a list of three or five of the most recently used hearing aid profiles, and a complete data file of all of the hearing aid profiles can be retained in the memory of the remote device. In these embodiments, the hearing aid may selectively retrieve the hearing aid profile from one of the memory within the hearing aid or a memory of the remote device based on the hearing aid profile ID in the lookup table.

Although the present invention has been described with reference to preferred embodiments, workers skilled in the art will recognize that changes may be made in form and detail without departing from the scope of the invention.

What is claimed is:

1. A hearing aid comprising:

a microphone to convert sounds into electrical signals;

a transceiver configured to communicate with a computing device through a wireless communications channel;

a processor coupled to the microphone and the transceiver;

a memory accessible to the processor and configured to store a lookup table including a plurality of hearing aid profile identifiers (IDs) and a plurality of usability values, each of the plurality of hearing aid profile IDs corresponding to a respective one of a plurality of hearing aid profiles and each of the plurality of usability values corresponding to one of the plurality of hearing aid profile IDs, the memory configured to store instructions that, when executed by the processor cause the processor to *perform operations of*:

*comparing a value related to a sound sample to a baseline value to determine a difference;*

*when the difference is greater than a predetermined threshold for a predetermined period of time,*

[identify] *identifying* a hearing aid profile ID from the lookup table based on [a] *the* sound sample by comparing a parameter associated with the sound sample to at least one of the plurality of usability values to identify an approximate match[;],

[retrieve] *retrieving* a hearing aid profile from the computing device using the hearing aid profile ID[;], and

[apply] *applying* the hearing aid profile *instead of a previously selected hearing aid profile* to modulate an audio output signal*; and*

*when the difference is not greater than the predetermined threshold for the predetermined period of time,*

*applying the previously selected hearing aid profile to modulate the audio output signal, and*

*repeating the operations performed by the processor by comparing a value related to another sound sample to the baseline value to determine the difference.*

2. The hearing aid of claim 1, wherein each of the usability values includes one or more values for determining suitability of a hearing aid profile to the sound sample.

3. The hearing aid of claim 1, wherein the usability values include an average volume.

4. The hearing aid of claim 1, wherein:

the memory includes a first plurality of hearing aid profiles;

the computing device includes a second plurality of hearing aid profiles; and the plurality of hearing aid profiles includes the first and second pluralities of hearing aid profiles.

5. The hearing aid of claim 1, wherein the memory includes second instructions that, when executed by the processor, cause the processor to:

detect a change in an acoustic environment based on the electrical signals; and identify the hearing aid profile ID from the plurality of hearing aid profile IDs in response to detecting the change.

6. The hearing aid of claim 1, wherein the processor stores the hearing aid profile as an active hearing aid profile in the memory in response to receiving the hearing aid profile from the computing device.

7. The hearing aid of claim 1, further comprising:

a speaker including an input coupled to the processor for receiving the audio output signal; and the processor applies the hearing aid profile to the electrical signals to produce a shaped output signal, wherein the shaped output signal is reproduced as sound by the speaker.

8. A method comprising:

receiving [a] *one or more* sound [sample] *samples*;

*comparing values related to the sound samples to a baseline value until a value associated with one of the sound samples differs from the baseline value by a predetermined amount for a predetermined period of time;* identifying a hearing aid profile identifier (ID) from a table including a plurality of hearing aid profile identifiers (IDs) and a plurality of usability values by comparing a parameter associated with the *one of the* sound [sample] *samples* to at least one of the plurality of usability values to identify an approximate match, each of the plurality of hearing aid profile IDs corresponding to a respective one of a plurality of hearing aid profiles and each of the plurality of usability values corresponding to one of the plurality of hearing aid profile IDs; and sending a request including the hearing aid profile ID to a computing device through a communication channel to retrieve a hearing aid profile that corresponds to the heating aid profile ID during operation.

9. The method of claim 8, further comprising:

receiving the *one or more* sound [sample] *samples* at a processor of a hearing aid;

comparing a value related to the sound sample to a baseline value to determine a first difference; and when the first difference is greater than a threshold, executing instructions to compare one or more parameters of the sound sample to parameters corresponding to each of the plurality of hearing aid profile IDs to identify the hearing aid profile to request from the computing device.

10. The method of claim [9] *8*, wherein the [parameters corresponding to each of the plurality of hearing aid profile IDs] *usability values* are representative of suitability of a hearing aid profile to the *one of the* sound [sample] *samples*.

11. The method of claim [9] *8*, wherein the [parameters corresponding to each of the plurality of hearing aid profile IDs] *usability values* and the hearing aid profile IDs are stored in a lookup table.

12. The method of claim [9] *8*, wherein the [parameters corresponding to each of the plurality of hearing aid profile IDs] *usability values* include at least one frequency range.

13. The method of claim [9] *8*, wherein the [parameters corresponding to each of the plurality of hearing aid profile IDs] *usability values* include a frequency average.

14. The method of claim 8, wherein sending the request comprises:

generating a hearing aid profile request including the hearing aid profile ID and associated instructions; and sending the hearing aid profile request to the computing device through the communication channel to retrieve the hearing aid profile from a plurality of hearing aid profiles stored in a memory of the computing device.

15. The method of claim [9] *8*, wherein, when the hearing aid profile is not identified, the method further comprises:

generating an alert including data related to [the] *a* sound-related signal; and sending the alert to the computing device through the communication channel.

16. The method of claim 8, further comprising:

receiving the hearing aid profile from the computing device through the communication channel is response to sending the request; and applying the hearing aid profile to [the] *a* sound-related signal using the processor of the hearing aid.

*17. A hearing aid, comprising:*

*at least one memory and processor;*

*means for receiving and converting sounds into electrical signals; and*

*means for wirelessly communicating with a remote computing device,*

*wherein the memory is configured to store instructions that, when executed by the processor, cause the processor to perform operations comprising*

*comparing values related to sound samples received by the means for receiving and converting sounds to a baseline value until a value associated with one of the sound samples differs from the baseline value by a predetermined amount for a predetermined period of time; and*

*identifying a hearing aid profile identifier (ID) from a lookup table stored in the memory by comparing a parameter associated with the one of the sound samples to one or more usability values and identifying an approximate match, wherein each usability value corresponds to a selected hearing aid profile ID; and*

*applying a hearing aid profile corresponding to the identified hearing aid profile ID to shape acoustic signals and produce a modified audio output signal for playback.*

*18. The hearing aid of claim 17 wherein:*

*the memory is configured to store a first set of hearing aid profiles;*

*the remote computing device is configured to store a second set of hearing aid profiles; and*

*the operation of applying a hearing aid profile corresponding to the identified hearing aid profile ID comprises selectively retrieving the hearing aid profile from one of the memory of the hearing aid or a memory of the remote computing device.*

*19. The hearing aid of claim 18 wherein the remote computing device is a smart phone.*

*20. The hearing aid of claim 18 wherein the second set of hearing aid profiles includes a greater number of profiles than the first set of hearing aid profiles stored.*

*21. The hearing aid of claim 17 wherein the usability value associated with each hearing aid profile ID represents one or more characteristics associated with an acoustic environment of the one of the sound samples including frequency content range, an average amplitude range, an average background noise range, a peak amplitude, sound pressure, durational information, an average volume, or any combination thereof.*

*22. The hearing aid of claim 17 wherein the hearing aid profile comprises a set of acoustic configuration settings, configured for use by the processor, to shape the acoustic signals, and wherein the acoustic configuration settings include directionality adjustments to focus the directionality of the means receiving and converting sounds.*

*23. The hearing aid of claim 17 wherein the hearing aid profile comprises a set of acoustic configuration settings, configured for use by the processor, to shape the acoustic signals, and wherein the acoustic configuration settings*

*include noise-filtering features configured to utilize signal-to-noise ratios and/or sound pressure to shape the acoustic signals.*

*24. The hearing aid of claim 17 wherein the memory includes second instructions that, when executed by the processor, cause the processor to perform operations comprising:*

*storing the hearing aid profile corresponding to the identified hearing aid profile ID as an active hearing aid profile in the memory of the hearing aid.*

*25. The hearing aid of claim 17 wherein the sound samples are received periodically by the means for receiving and converting sounds.*

*26. A method, comprising:*

*receiving one or more sound samples, via a hearing aid, from a current acoustic environment of a user;*

*comparing values related to the sound samples to a baseline value until a value associated with an individual one of the sound samples differs from the baseline value by a predetermined amount for a predetermined period of time; and*

*comparing a parameter associated with the individual one of the sound samples to at least one of a plurality of usability values and identifying an approximate match, wherein each usability value corresponds to a selected hearing aid profile identifier (ID) stored in a lookup table in memory of the hearing aid;*

*selectively retrieving, during operation of the hearing aid, a hearing aid profile corresponding to the identified hearing aid profile ID.*

*27. The method of claim 26, further comprising producing a modified audio output signal for the user by applying, via a processor of the hearing aid, the hearing aid profile to a sound-related signals.*

*28. The method of claim 26 wherein selectively retrieving the hearing aid profile comprises retrieving the hearing aid profile from memory of the hearing aid.*

*29. The method of claim 26 wherein selectively retrieving the hearing aid profile comprises retrieving the hearing aid profile from a memory of a remote computing device.*

*30. The method of claim 26 wherein selectively retrieving the hearing aid profile comprises retrieving the hearing aid profile from a memory of a smart phone.*

*31. The method of claim 26 wherein selectively retrieving the hearing aid profile comprises retrieving the hearing aid profile from a memory of a mobile computing device.*

* * * * *